(12) United States Patent
Borup

(10) Patent No.: US 6,628,014 B2
(45) Date of Patent: Sep. 30, 2003

(54) CABLE VOLTAGE DROP COMPENSATION IN AN ELECTRIC POWER SUPPLY SYSTEM

(75) Inventor: Uffe Vikøren Borup, Odense C (DK)

(73) Assignee: Axa Power A/S, Odense N (DK)

(*) Notice: Subject to any disclaimer, the term of this patent is extended or adjusted under 35 U.S.C. 154(b) by 0 days.

(21) Appl. No.: 10/193,233

(22) Filed: Jul. 12, 2002

(65) Prior Publication Data
US 2003/0016001 A1 Jan. 23, 2003

(30) Foreign Application Priority Data
Jul. 16, 2001 (EP) .............................. 01610079

(51) Int. Cl.[7] .............................. H02J 1/00; H02J 3/12
(52) U.S. Cl. .................... 307/103; 307/130; 307/131
(58) Field of Search ........................... 307/103, 97, 98, 307/99, 116, 125, 127, 130, 131

(56) References Cited

U.S. PATENT DOCUMENTS

| | | | |
|---|---|---|---|
| 4,313,081 A | 1/1982 | Smith | |
| 5,117,174 A | 5/1992 | Kessler | |
| 5,982,645 A | * 11/1999 | Levran et al. | 363/37 |
| 6,125,048 A | 9/2000 | Loughran et al. | |
| 6,545,887 B2 | * 3/2003 | Smedley et al. | 363/89 |

FOREIGN PATENT DOCUMENTS

| | | |
|---|---|---|
| EP | 0 421 689 | 4/1991 |
| GB | 2059670 | 4/1981 |

OTHER PUBLICATIONS

Du Y et al, "Experimental Investigation into Harmonic Impedance of Low–Voltage Cables", IEE Proceedings, vol. 147, No. 6, Nov. 13, 2000.
Gruzs T.M., "Design Considerations for Powering 415 HZ Computer Systems", IEEE, vol. 2, Conf. 23, Oct. 2, 1988.
Lu et al, "A DFT–Based Approach for Precise Tuning of a Band–Pass Filter for the Extraction of Control Signals from Power Lines", IEEE, vol. 3, Conf. 18, Nov. 9, 1992.

* cited by examiner

Primary Examiner—Shawn Riley
(74) Attorney, Agent, or Firm—Lowe Hauptman Gilman & Berner, LLP

(57) ABSTRACT

For compensation of voltage drop in a multi-conductor cable (3) connecting an electric multi-phase power source (1) with a consumer installation (4), in particular for supply of ground power to aircraft standing in airport parking positions, adjustment of the output voltage of the electric power source (1) to a level above the nominal voltage is accomplished by determining a set of cable impedance parameters and vector representations of the fundamental components of the individual output currents of the phases of the multi-phase AC power. By matrix multiplication of the vector representations of the fundamental current components by the cable model matrix a set of vector representations of fundamental voltage drop signals is calculated for the phases of the multi-phase AC power, and used as reference signals for a voltage controller (13) in the power source (1) to produce for each phase a compensation voltage for addition to the nominal voltage.

7 Claims, 2 Drawing Sheets

CABLE VOLTAGE DROP COMPENSATION IN AN ELECTRIC POWER SUPPLY SYSTEM

CROSS-REFERENCE TO RELATED APPLICATIONS

The present application claims the benefit of priority from European Patent Application No. 01610079.4 filed on Jul. 16, 2001.

BACKGROUND OF THE INVENTION

The present invention relates to voltage drop compensation in a multi-conductor cable connecting an electric power source with a consumer installation demanding supply of multi-phase AC power of a predetermined frequency and nominal voltage. In particular, the invention is concerned with the supply of ground power to aircraft standing in airport parking positions.

AC power supply systems including converter systems like UPS systems and Ground Power Units or GPU's as used e.g. in airports for the supply of electric power to parked aircraft are frequently located far from the consumer installation. This can be due to environmental factors, hazards or space requirements. In an airport installation, a GPU is often mounted under the passenger bridge for connection with an aircraft through a cable in a hoist. An alternative approach may be location of the GPU in the airport building and running of the cable through a duct to a pit close to the aircraft parking position. Depending on the actual layout cable lengths of up to 100 meters may be required.

For the AC power supply demanded by an aircraft, typically 3×200 V, 400 Hz, the cable voltage drop is significant and the voltage quality at the aircraft installation may easily fail to comply with the voltage requirement of electrical loads on aircraft, specified as 115±3 V in phase values. In addition, if unsymmetrical cables are used, significant unbalance will be generated at the output even with balanced loads.

The voltage drop may in practice be reduced by running several cables in parallel which is an undesirably expensive solution, however, requiring an excessive amount of copper far beyond what is required to reach a prescribed thermal capability of the cable.

By proper cable design the voltage drop can be somewhat reduced. Thus, with use of e.g. a 7 conductor symmetrical cable the inductive voltage drop will be balanced and reduced compared to a conventional unsymmetrical 4 conductor cable when applied with balanced load.

In some state of the art ground power units for airport use a possibility for compensation of the cable voltage drop is provided based on one of the following approaches:

1. Compensation based on one parameter, where the compensation is proportional to the amplitude of the GPU output current determined either as a mean value of the three phases or individually per phase. This form of compensation will only work with the specified power factor used during set-up. Because inductive load banks are not commonly available in airports, the compensation is normally adjusted to a power factor close to 1.0, whereas the power factor of aircraft loads is usually about 0.8. In result, by this approach correct voltage drop compensation can not be obtained.
2. Compensation based on two parameters, by which the converter is able to adjust the compensation depending on the power factor as well. With this approach, however, the effect of unsymmetrical cables can still not be compensated and with an unbalanced load the compensation voltage calculation will fail to include the additional voltage drop added to return current in the neutral conductor during unbalanced load conditions.
3. Feed-back of output voltages to the GPU through the control wire that is often included in power cables for 400 Hz airport installations. This approach is possible, if the control wires are twisted to cancel the coupling between the power conductors. By relying on feedback from the load end of the cable the voltage control will be very dependent on the availability and reliability of the control wires. Since the control wires are much thinner than the power conductors, they show a tendency, however, to break over time, when the cable is bent during handling.

Both of approaches 1 and 2 require loading of the GPU and iterative adjustments which can be time consuming. Moreover, bad installation designs with use of unsymmetrical cables in a duct may require transposal of the cable wires in several places for compliance with output requirements.

Other approaches for line voltage drop compensation in electrical distribution systems have been disclosed.

Thus, in a line drop compensator device disclosed in U.S. Pat. No. 4,313,081 capacitance is added-between the conductor lines and the neutral of the power cable in response to the sensed current flow through the cables to correct the voltage in proportion to the actual demand. This requires current measurements at a plurality of service point along the three phase power line.

An electric power system with line drop compensation disclosed in U.S. Pat. No. 5,117,174 requires in addition to use of a local voltage regulator for monitoring the output voltage of the power source use of a remote voltage regulator for sensing voltage on the power bus at a point of regulation away from the power source to produce a PWM (Pulse Width Modulated) signal having a duty cycle representative of the voltage at the point of regulation.

In a power delivery system disclosed in U.S. Pat. No. 6,125,048 the voltage delivered from a central power unit is calibrated in accordance with the determined impedance of the supply lines, whereby the impedance determination can be provided by conduction of a reference voltage through a calibration line, transmission of a sweep tone down the supply line or a time domain reflectometer technique. Alternatively the impedance may be determined based on the measured input voltage to the remote unit supplied with power from the central unit or the measured power level of a signal transmitted from the remote unit.

BRIEF SUMMARY OF THE INVENTION

On the background of this prior art it is the object of the invention to provide a method for compensation of voltage drop in a multi-conductor cable based on a novel compensation scheme involving the use of a stored cable model in the power source to produce voltage drop signals usable as reference produce voltage drop signals usable as reference signal for a voltage controller to provide a compensation voltage to be added to the nominal voltage level required by the consumer installation.

To meet this object the invention provides a method of compensating voltage drop in a multi-conductor cable connecting an electric power source with a consumer installation demanding supply of multi-phase AC power of a predetermined frequency and nominal voltage, in particular for supply of ground power to aircraft standing in airport parking positions, comprising adjustment of the output voltage of the electric power source to a level above said nominal voltage and further comprising the steps of a) determining a set of cable impedance parameters,
b) storing said set of cable impedance parameters in the form of a cable model matrix in a memory forming part of a voltage drop compensation control circuit in the power source,
c) determining vector representations of the fundamental components of the individual output currents of the phases of the multi-phase AC power,
d) calculating for the phases of the multi-phase AC power a set of vector representations of fundamental voltage drop signals by matrix multiplication of the vector representations of said fundamental current components by said cable model matrix, and
e) using the vector representations of said fundamental voltage drop signals as reference signals for a voltage controller in said power source to produce for each of said phases a compensation voltage for addition to said nominal voltage.

By this novel compensation scheme based on the flux-linkage equations of the cable, the parameters of which are dependent on the physical distances of the cable conductors, voltage drop in symmetrical as well as unsymmetrical cables connected with balanced as well as unbalanced loads a significantly more accurate and well-functioning compensation of the cable voltage drop without any requirement for additional wires or conductors in the cable for calibration purposes or for additional equipment located at the consumer installation end or remote end of the cable.

In a preferred embodiment a complete set of cable impedance parameters for use in the calculation of the voltage drop signals can be determined in a very quick and accurate way by a method characterized in that said set of cable impedance parameters is determined by supplying identical AC currents to one of said conductors, returning in one single other conductor, and carrying out individual consecutive voltage drop measurements over said single conductor and said single other conductor, while a short-circuit is formed at the remote end of the cable.

In a particularly advantageous implementation of this embodiment consecutive voltage drop measurements are carried out by short-circuiting all conductors of the cable at the remote end with a plug, supplying identical AC currents to all of said conductors except a single other conductor at the cable end connected with the output of the power source, and measuring the voltage drop over said single one conductor and said single other conductor.

For implementation of the compensation method outlined above the invention further provides an electric power supply system including a power source comprising a DC to AC inverter,
phase transformers connected with said DC to AC inverter for supply of multi-phase electrical power of a predetermined frequency and a nominal voltage to a consumer installation,
a voltage controller connected with said inverter for individual control of the voltage level of each phase produced thereby, and
a voltage drop compensation control circuit connected between an output of the power source and said voltage controller, said compensation control circuit comprising
a memory storing a cable model matrix including a set of cable impedance parameters,
means for determining individual phase currents at the output of said power source,
discrete Fourier transformation means for determining vector representations of the fundamental components of said individual phase currents,
matrix multiplication means for calculation for the phases of the multi-phase AC power a set of vector representations of fundamental voltage drop signals by matrix multiplication of the vector representations of said fundamental current components by said cable model matrix, and
means for supplying the vector representations of said fundamental voltage drop signals as reference signals to said voltage controller to produce for each of said phases a compensation voltage for addition to said nominal voltage.

BRIEF DESCRIPTION OF THE SEVERAL VIEWS OF THE DRAWING

Examples of the invention will now be explained below with reference to the very schematical drawings, in which.

DETAILED DESCRIPTION OF THE INVENTION

Figure 1:
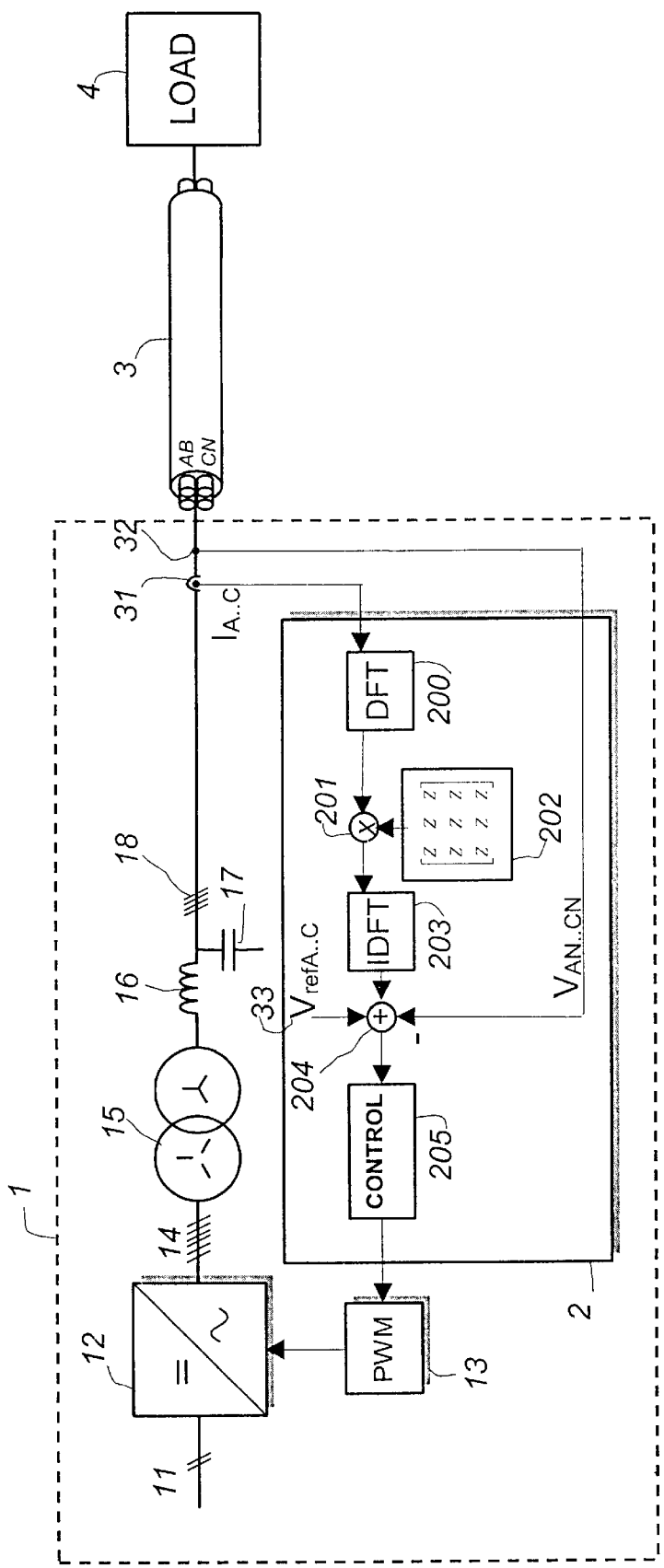
FIG. 1 is a simplified block diagram illustrating an electric power supply system embodying the voltage drop compensation control circuit according to the invention connected via a cable to a consumer installation.

FIG. 1 illustrates an electric power supply system 1 embodying the voltage drop compensation control circuit 2 according to the invention. The electric power supply unit 1 is connected via a cable 3 to a consumer installation or load 4. The cable 3 has a supply end and a remote end, the supply end being adapted for connection with the electric power supply unit 1 and the remote end being adapted for connection with a load 4.

In the preferred embodiment, the load 4 is the electrical system of an aircraft standing in an airport parking position. Such electrical systems of aircraft are typically three phase systems operating at frequencies of 400 Hz and voltages of 3×200 V.

The electric power supply unit 1 includes an inverter 12. The inverter 12 creates a three phase 400 Hz output voltage from a DC input voltage. If desired, the inverter could include rectifier means for converting a 50 Hz or 60 Hz AC input voltage to DC voltage before converting it to 400 Hz AC.

The inverter 12 is in this embodiment controlled by a voltage controller including a pulse width modulator 13. The pulse width modulator 13 modulates the DC voltage so as to create the desired 400 Hz AC out-put of the inverter 12. This AC voltage is supplied to the primary side of a open Y—Y coupled transformer 15 via six conductors 14. The secondary side supplies a three phase AC current and a neutral to an output line with four conductors 18 for the three phases and neutral, respectively. A low pass filter 16, 17 may be provided at the output of the transformer for smoothing the wave forms.

The pulse width modulator 13 controls the inverter 12 to deliver a given voltage at the output 32 of the electric power supply unit 1. In order to provide the required voltage at the remote end of the cable 3, where it is connected to the load 4, the set voltage needs to take into consideration the cable voltage drop between the output 32 of the electric power supply unit 1 and the load 4. This voltage drop depends on the cable parameters i.e. length of cable, cable construction, temperatures etc.

The voltage drop of the cable thus needs to be compensated by increasing the voltages at the output 32. The present invention provides a new and inventive way of effecting this compensation.

In the embodiment of FIG. 1 this compensation involves the use of a voltage drop compensation control circuit 2. The compensation circuit 2 calculates the duty cycle of the pulse width modulator 13 needed to obtain the desired voltage at the output 32.

The control circuit 2 employs a new and inventive method to determine the compensation voltage. The method is based on an impedance matrix [z] representing a cable model. In use, a current vector $\bar{I}_{A\ldots C}$ is measured at the point 31 located at the output 32 of the electric supply unit 1. The current vector $\bar{I}_{A\ldots C}$ is transformed into the frequency domain by the use of a discrete Fourier transformation or DFT means 200. The resulting vector is a representation of the fundamental components of the individual three phase currents and is subsequently multiplied at a multiplication node 201 with a predetermined cable impedance matrix [z] to be described in greater detail further on. The matrix [z] represents a cable model, and is stored in a memory 202. By inverse discrete Fourier transformation or IDFT means 203 the result of the vector multiplication at node 201 is returned into the time domain as a calculated voltage $V_{calcA\ldots C}$ (not shown).

The output of IDFT 203 is thus a representation of the fundamental voltage drop of the cable 3 using the cable model matrix. The output of 203 is added at a summing node 204 to a set reference voltage $V_{refA\ldots C}$, e.g. 115 V, and a negative measured voltage $V_{AN\ldots CN}$ is also added at the same node. The set reference voltage $V_{refA\ldots C}$ is the predetermined reference voltage corresponding to the desired voltage at the remote cable end and the negative measured voltage $V_{AN\ldots CN}$ is the negative value of the voltage measured at the output 32 of the electric power supply unit 1, being the voltage difference between the respective phase conductor and the neutral conductor at the cable supply end. The result of the summation is used as input for a voltage controller 205. The output of the voltage controller 205 is then used as input for the PWM 13 as mentioned above.

In an alternative embodiment the IDFT 203 may be dispensed with and a transformation of the measured voltage into a vector $\bar{V}_{AN\ldots CN}$ is performed with another DFT, whereas the reference voltage is supplied in the form of a vector $\bar{V}_{refA\ldots C}$, such that the output from the summing node 204 is in the frequency domain.

As mentioned earlier, the cable parameters and thus the impedances may depend on cable construction, cable length, temperatures etc. The use of the impedance matrix in the present invention allows for an important advantage. The advantage resides in the fact that the electric power supply unit 1 can be readily adapted to different types of cables, since it only involves an update of the matrix to match the actual cable 3 used.

According to a second aspect of the invention the impedance matrix [z] may be determined or updated for such different cables using the method described below with reference to FIGS. 2 and 3.

Figure 2:
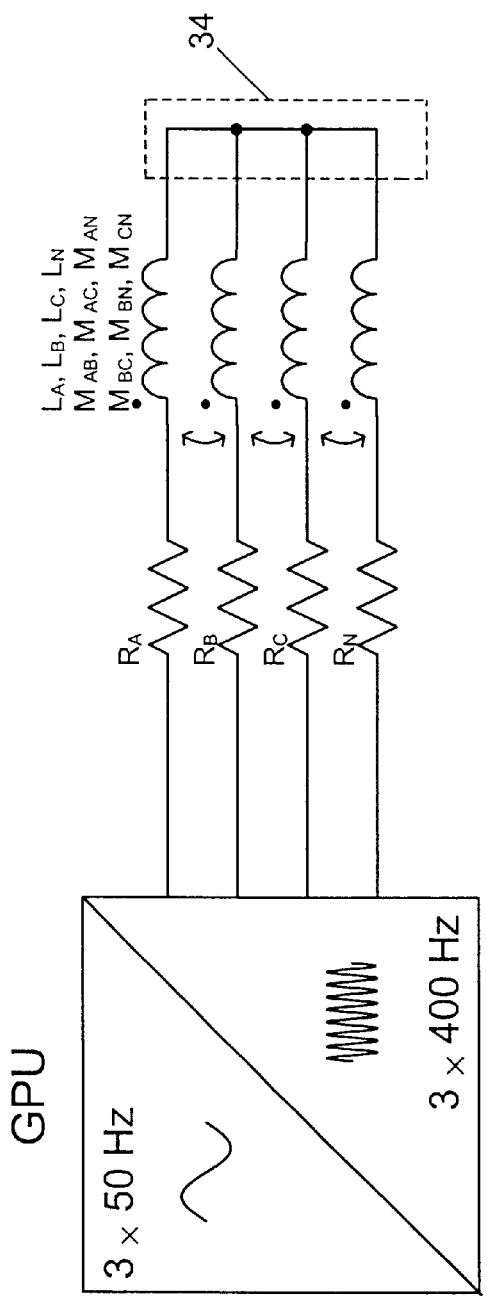
FIG. 2 is a simplified block diagram illustrating the determination of the cable impedance parameters for the cable model matrix for the embodiment shown in FIG. 1 short-circuiting all of the conductors in a cable.

The method for determining the cable model matrix or cable impedance matrix [z] of a given cable 3 involves short circuiting the conductors at the remote end of the cable 3 as shown in FIG. 2. As shown schematically, this may advantageously be effectuated by connecting a single common short-circuiting plug 34 with the load end of the cable 3. It may also be effectuated by individually and consecutively connecting one single conductor to another single conductor as shown in FIG. 3.

In FIG. 2 $R_A$, $R_B$, $R_C$, $R_N$ are the resistance values, $L_A$, $L_B$, $L_C$ and $L_N$ are the reactance values of the A, B, and C phase conductors and the neutral N conductor, respectively, and $M_{AB}$, $M_{AC}$, $M_{AN}$, $M_{BC}$, $M_{BN}$, $M_{CN}$ are the mutual reactance values between two respective conductors.

Figure 3:
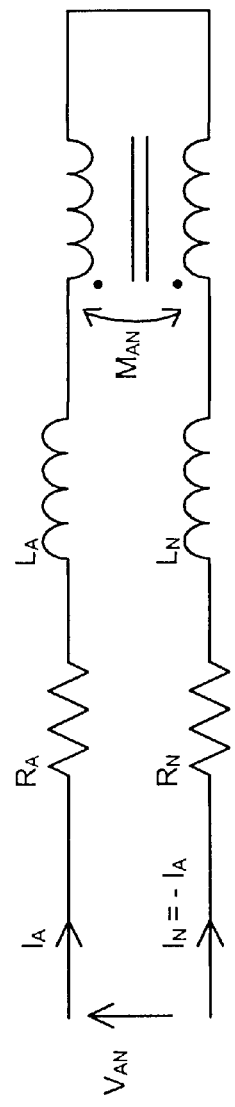
FIG. 3 is a very simplified block diagram illustrating one example of the individual consecutive measurements of the voltage drop over one single conductor (A) and one single other conductor (N) for determining the cable impedance parameters in a short-circuit.

In accordance with the invention the complete determination of the impedance parameters is conducted by six consecutive measurements, by each of which a predetermined test current $\bar{I}$, which is the same in all six measurements, is supplied to a single one of phase conductors A, B, C with return through a single other conductor, i.e. one of the other phase conductors or the neutral conductor N as shown in the table below, and the cable voltage drop is measured between the ends of the two conductors connected with the electric power unit 1 as shown in FIG. 3.

| Supply | Return |
|---|---|
| A | N |
| B | N |
| C | N |
| A | B |
| B | C |
| A | C |

FIG. 3 illustrates as an example the individual voltage drop measurement $\bar{V}_{AN}$ over the phase conductor A and the neutral conductor N, by supply of the test current $\bar{I}_A$ to conductor A and return through the neutral conductor N, whereby $\bar{I}_N = -\bar{I}_A$. One conductor is shown connected to the neutral conductor in order to present all three parameter types R, L and M and currents $\bar{I}_A$ and $\bar{I}_N$ of the two conductors and the measured voltage difference $\bar{V}_N$ which is actually the voltage drop for the single phase conductor and neutral conductor combined.

The relationship between the voltage drop measurements and the impedance parameters can be expressed by the equations assuming equal and symmetrical currents with respect to the neutral phase:

$$\bar{V}_{AN} = \bar{I} \cdot (R_A + R_N + j(L_A + L_N) - 2jM_{AN})$$

$$\bar{V}_{BN} = \bar{I} \cdot (R_B + R_N + j(L_B + L_N) - 2jM_{BN})$$

$$\bar{V}_{CN} = \bar{I} \cdot (R_C + R_N + j(L_C + L_N) - 2jM_{CN})$$

$$\bar{V}_{AB} = \bar{I} \cdot (R_A + R_B + j(L_A + L_B) - 2jM_{AB})$$

$$\bar{V}_{BC} = \bar{I} \cdot (R_B + R_C + j(L_B + L_C) - 2jM_{BC})$$

$$\bar{V}_{AC} = \bar{I} \cdot (R_A + R_C + j(L_A + L_C) - 2jM_{AC})$$

All impedance parameters can thus be determined by calculating the real and imaginary parts of these six equations, based on the measured voltage $\bar{V}_{AN\ldots AC}$.

The impedance parameters thus determined may now be used for establishment of the cable model [z] e.g. in forming a matrix with:

$Z_{AAN}=R_A+R_N+j(L_A+L_N-2\cdot M_{AN})$ $Z_{ABN}=R_N+j(M_{AB}-M_{AN}+L_N-M_{BN})$ $Z_{ACN}=R_N+j(M_{AC}-M_{AN}+L_N-M_{CN})$ $Z_{BAN}=R_N+j(M_{AB}-M_{BN}+L_N-M_{AN})$ $Z_{BBN}=R_B+R_N=j(L_B+L_N-2\cdot M_{BN})$ $Z_{BCN}=R_N+j(M_{BC}-M_{BN}+L_N-M_{CN})$ $Z_{CAN}=R_N+j(M_{AC}-M_{CN}+L_N-M_{AN})$ $Z_{CBN}=R_N+j(M_{BC}-M_{CN}+L_N-M_{BN})$ $Z_{CCN}=R_C+R_N+j(L_C+L_N-2\cdot M_{CN})$ rendering in the [z] matrix:

$$\begin{bmatrix} Z_{AAN} & Z_{ABN} & Z_{ACN} \\ Z_{BAN} & Z_{BBN} & Z_{BCN} \\ Z_{CAN} & Z_{CBN} & Z_{CCN} \end{bmatrix}$$

This resulting impedance matrix [z] is now used for storage in the memory 202 and consequently for calculation of the output voltage from the IDFT 203:

$$\overline{V}_{calcA\ldots C}=IDFT([z]\cdot DFT\, \overline{I}_{A\ldots C})$$

The measuring procedure or calibration to determine the cable impedance matrix [z] mentioned above is typically carried out when the GPU 1 is first installed at a location in an airport, and if a new cable, e.g. of a different length or construction is connected to the GPU. The set reference voltage is selected at this time or preset when shipped.

In operation the cable 3 is connected to the aircraft load 4 and since the output voltages are changed by the compensation acting on the inverter 12, the load-currents will respond to this change and the cable compensation will show a damped response when it is applied and also a damped response by changes in the load currents. Thus the compensation circuit 2 provides for a reliable compensation process and a GPU designed for the regulated limits of the voltage at the cable load end. The cable is according to the invention not as crucial as in the prior art.

Moreover, the compensation will also provide the correct output voltage at the load end of the cable 3 even at unbalanced loads, because the compensation is performed based on the cable parameters independent of the actual load 4 at the remote end of the cable 3.

It should be understood that the above description is only one example of an embodiment according to the invention and that the invention may be implemented in many other ways without departing from the scope of the invention. In particular the cable construction is not restricted to a four conductor asymmetrical cable, but may also be symmetrical multi conductor cables, e.g. a 6 or 7 conductor symmetrical cable. Also other types of modulation such as pulse code or pulse power or a combination may be used for controlling the inverter 12. The type of inverter 12 is also not important for the invention, but could be any conventional type, and could supply 50 Hz or 60 Hz or any other desired frequency instead of the 400 Hz commonly used in aircraft.

What is claimed is:

1. A method of compensating voltage drop in a multi-conductor cable (3) connecting an electric power source (1) with a consumer installation (4) demanding supply of multi-phase AC power of a predetermined frequency and nominal voltage, in particular for supply of ground power to aircraft standing in airport parking positions, comprising adjustment of the output voltage of the electric power source to a level above said nominal voltage and further comprising the steps of
  a) determining a set of cable impedance parameters,
  e) storing said set of cable impedance parameters in the form of a cable model matrix in a memory (202) forming part of a voltage drop compensation control circuit (2) in the power source (1),
  f) determining vector representations of the fundamental components of the individual output currents of the phases of the multi-phase AC power,
  g) calculating for the phases of the multi-phase AC power a set of vector representations of fundamental voltage drop signals by matrix multiplication of the vector representations of said fundamental current components by said cable model matrix, and
  h) using the vector representations of said fundamental voltage drop signals as reference signals for a voltage controller (13) in said power source (1) to produce for each of said phases a compensation voltage for addition to said nominal voltage.

2. A compensation method as claimed in claim 1, wherein said set of cable impedance parameters is determined by individual consecutive current or voltage measurements controlled by the power source for each single phase conductor of the cable (3) with return through a single other conductor forming a short-circuit therewith at the end of the cable to be connected with said consumer installation (4).

3. A compensation method as claimed in claim 2, wherein said consecutive measurements are carried out by short-circuiting all conductors of the cable (3) at the end thereof to be connected with the consumer installation (4), supplying an AC currents to said single phase conductor at the cable end connected with the output of the power source (1) and measuring the voltage drop over said single phase conductor and said single other conductor.

4. A compensation method as claimed in claim 1, wherein said fundamental components of the individual phase output currents supplied by the power source (1) are determined by discrete Fourier transformation of phase currents measured by power measurement of each phase supplied by the power source at the output thereof.

5. An electric power supply system including a power source (1) comprising
  a DC to AC inverter (12),
  phase transformers (15) connected with said DC to AC inverter for supply of multi-phase electrical power of a predetermined frequency and a nominal voltage to a consumer installation (4),
  a voltage controller (13) connected with said inverter (12) for individual control of the voltage level of each phase produced thereby, and
  a voltage drop compensation control circuit (2) connected between an output of the power source (1) and said voltage controller (13), said compensation control circuit comprising
    a memory (202) storing a cable model matrix including a set of cable impedance parameters,
    means for determining individual phase currents at the output of said power source,
    discrete Fourier transformation means (200) for determining vector representations of the fundamental components of said individual phase currents,
    matrix multiplication means (201) for calculation for the phases of the multi-phase AC power a set of vector representations of fundamental voltage drop signals by matrix multiplication of the vector representations of said fundamental current components by said cable model matrix, and means (204, 205) for supplying the vector representations of said fundamental voltage drop signals as reference signals to said voltage controller (13) to produce for each of said phases a compensation voltage for addition to said nominal voltage.

6. An electric power supply system as claimed in claim 5, wherein the power source (1) comprises means for determination of said set of cable impedance parameters by individual consecutive voltage or current measurements controlled by the power source for each single conductor of the cable (3) with return through a single other conductor, the system further including means for short-circuiting said single conductor and said single other conductor, at the end of the cable (3) to be connected with said consumer installation (4).

7. An electric power supply system as claimed in claim 6, wherein said short-circuiting means comprises a common short-circuiting plug (34) connectable with said end of the cable (3) to be connected with the consumer installation (4) to form short-circuits between all conductors of the cable (3), means being provided in the power source (1) for consecutive supply of an AC current to one single phase conductor except said single other conductor, said measurement of said voltage drop being carried out over said single phase conductor and said single other conductor.

* * * * *